(12) United States Patent
Rivner et al.

(10) Patent No.: US 8,856,928 B1
(45) Date of Patent: Oct. 7, 2014

(54) PROTECTING ELECTRONIC ASSETS USING FALSE PROFILES IN SOCIAL NETWORKS

(75) Inventors: Uri Rivner, Mishmeret (IL); Idan Aharoni, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 152 days.

(21) Appl. No.: 13/535,417

(22) Filed: Jun. 28, 2012

(51) Int. Cl.
*G06F 11/00* (2006.01)
*G06F 12/14* (2006.01)
*G06F 12/16* (2006.01)

(52) U.S. Cl.
USPC ............................................. 726/23; 713/193

(58) Field of Classification Search
USPC ......................................................... 726/23
See application file for complete search history.

(56) References Cited

U.S. PATENT DOCUMENTS

| | | | |
|---|---|---|---|
| 7,904,958 B2 | 3/2011 | Lee | |
| 7,917,593 B1 * | 3/2011 | Lee | 709/206 |
| 8,255,572 B1 * | 8/2012 | Coomer | 709/248 |
| 8,549,642 B2 | 10/2013 | Lee | |
| 2005/0041789 A1 * | 2/2005 | Warren-Smith et al. | 379/93.24 |
| 2009/0037983 A1 * | 2/2009 | Chiruvolu et al. | 726/4 |
| 2011/0179487 A1 * | 7/2011 | Lee | 726/23 |
| 2012/0110645 A1 * | 5/2012 | Spalka et al. | 726/4 |
| 2012/0167208 A1 * | 6/2012 | Buford et al. | 726/22 |
| 2013/0145465 A1 * | 6/2013 | Wang et al. | 726/23 |

OTHER PUBLICATIONS

Richard G. Brody, Phishing, Pharming and Identity Theft; Year: 2007; Citeseer; pp. 43-56.*

* cited by examiner

*Primary Examiner* — Philip Chea
*Assistant Examiner* — Monjour Rahim
(74) *Attorney, Agent, or Firm* — BainwoodHuang (57) ABSTRACT

An improved technique utilizes a honeypot-style seeding of synthetic user identifiers which, if used by spear-phishing intruders, enable easy discovery of the intruders. Along these lines, an administrator of a network constructs false employee profiles on a social network with the intent of intercepting any email to that employee. Such employee profiles correspond to no actual employee of the corporation, but are in fact synthetic entities designed to appear to be an actual employee. These profiles contain identifiers that describe the employee, such as a name, position within the corporation, telephone number, educational background, past positions, and social connections. The administrator configures a receiver at the corporate network to block from entering the secure network emails that include references to any of these identifiers.

19 Claims, 5 Drawing Sheets

Source Address: 147.177.9.12     80
Destination Address: captain.ahab@example.com
...

84

From: doppelganger@bancofamerica.com     82

To: captain.ahab@example.com

Date: May 23, 2012 at 3:01 PM     86

Subject: your checking account

Captain,

I am writing to let you know that a malicious user attempted to access your account, and we had to lock it. The account may be unlocked by clicking on the link below:

Click Here to Unlock Account ——————— 88

Thank you for doing business with us.

Sincerely,

I. M. Notafraud
Account Specialist

PROTECTING ELECTRONIC ASSETS USING FALSE PROFILES IN SOCIAL NETWORKS

BACKGROUND

Computer networks on which sensitive electronic information is stored are susceptible to attacks by intruders hoping to gain access to that information. In a specific type of attack known as a spear-phishing attack, an intruder obtains detailed personal information about a particular person that has access to the sensitive electronic information or whose computer, if compromised, can serve as an entry point into the computer network.

Conventional approaches to combating spear-phishing attacks include automated filtering tools used in an email server. Such tools identify known sources of spear-phishing attacks and block malicious communications used in such attacks. For example, if it is known that a particular IP address was used in a spear-phishing attack, then an administrator can adjust rules of the automated filter to block any data packets which have that IP address as the source IP address in their header.

In a corporate network, conventional approaches to combating spear-phishing attacks include educating employees of the corporation that owns the network about recognizing a spear-phishing attack. For example, officials of the corporation can train employees to watch for unsolicited emails containing detailed personal information.

SUMMARY

Unfortunately, there are deficiencies with the above-described conventional approaches to combating spear-phishing attacks. For example, inputting rules into a filter relies on the fact that a spear-phishing attack has already occurred from a particular email address or follow some other previously observed pattern. That is, for a filter to be effective, someone has usually experienced loss due to a spear-phishing attack.

Moreover, intruders that carry out spear-phishing attacks typically have performed enough research on a corporation to know how to construct communications that will not be intercepted by a filter on the corporate network owned by the corporation. Such communications do not contain telltale signs of spam-based phishing attacks, e.g., misspellings, odd capitalizations, etc. A spear-phishing email will typically appear as if it was sent by a trusted individual and will have accurate personal information in the text of the email. The spear-phishing email is designed to lure even a well-trained employee of the corporation to respond in a way that allows the intruder to access content on the corporate network.

It should be understood that an intruder typically gathers information for a spear-phishing attack on corporations from information that is freely available on the Internet. For example, a social network (e.g., Facebook, LinkedIn) provides details of employees of corporations. Along these lines, a typical user of a social network lists a background, interests, work experience, etc., on the social network website. Some employees may not be aware that their information is freely available; other employees may make their information private, but will freely accept "friends." A malicious user that gains such access to this information can construct emails to these employees that are likely to lure the employees to download malware from the malicious user. Even when an employee keeps his or her information on the social network private, the malicious user may still gain access to the name of the employee; this may be enough in combination with knowledge of corporate email address patterns (e.g., firstname.lastname@corporation.com) to construct a legitimate-looking email.

In contrast to conventional approaches to combating spear-phishing attacks which rely on known sources of spear-phishing attacks, an improved technique utilizes a honeypot-style seeding of synthetic user identifiers which, if used by spear-phishing intruders, enable easy discovery of the intruders. Along these lines, an administrator of a network constructs false employee profiles on a social network with the intent of intercepting any email to that employee. Such employee profiles correspond to no actual employee of the corporation, but are in fact synthetic entities designed to appear to be an actual employee. These profiles contain identifiers that describe the employee, such as a name, position within the corporation, telephone number, educational background, past positions, and social connections. The administrator configures a receiver at the corporate network to issue an alert when incoming emails include references to any of these identifiers.

Advantageously, the improved technique allows for a receiver to be configured to issue alerts regarding spear-phishing attacks before they compromise network security. For example, if a fictitious email address such as "captain.ahab@example.com" is planted in social networking site, a receiver configured to detect a spear-phishing email to captain.ahab@example.com now has the ability to identify the intruder by the email address before the intruder can succeed with an attack. In some arrangements, an administrator sets up a real mailbox for the fictitious email address; the administrator may then add a rule to a filter on an email server stating that every email received in the real mailbox will cause an alert to be issued. The receiver may also be configured to guard against further activities by that attacker. For example, once the receiver identifies an email as part of a spear-phishing campaign, the administrator can then place information associated with the email (e.g., originating email address, return-to-address, etc.) in various security controls in the corporate network to prevent other employees from being targeted.

One embodiment of the improved technique is directed to a method of protecting a secure network from malicious communications. The method includes configuring, on the secure network, receiving circuitry to identify communications that include a particular user identifier. The method also includes storing the particular user identifier in a server remote from the secure network. The method further includes receiving, at the secure network, a particular communication and verifying, by the receiving circuitry, whether the particular communication includes the particular user identifier. The method further includes issuing an alert when the particular communications includes the particular user identifier and not issuing the alert when the particular communication does not include the particular user identifier.

Additionally, some embodiments of the improved technique are directed to a system constructed and arranged to protect a secure network from malicious communications. The system includes a network interface, a memory, and a processor coupled to the memory, the processor configured to carry the method of protecting a secure network from malicious communications.

Furthermore, some embodiments of the improved technique are directed to a computer program product having a non-transitory computer readable storage medium which stores code including a set of instructions to carry the method of protecting a secure network from malicious communications.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique utilizes a honeypot-style seeding of synthetic user identifiers which, if used by spear-phishing intruders, enable easy discovery of the intruders. Along these lines, an administrator of a network constructs false employee profiles on a social network with the intent of intercepting any email to that employee. Such employee profiles correspond to no actual employee of the corporation, but are in fact synthetic entities designed to appear to be an actual employee. These profiles contain identifiers that describe the employee, such as a name, position within the corporation, telephone number, educational background, past positions, and social connections. The administrator configures a receiver at the corporate network to issue an alert when incoming emails include references to any of these identifiers.

Advantageously, the improved technique allows for a receiver to be configured to issue alerts regarding spear-phishing attacks before they compromise network security. For example, if a fictitious email address such as "captain.ahab@example.com" is planted in social networking site, a receiver configured to detect a spear-phishing email to captain.ahab@example.com now has the ability to identify the intruder by the email address before the intruder can succeed with an attack. In some arrangements, an administrator sets up a real mailbox for the fictitious email address; the administrator may then add a rule to a filter on an email server stating that every email received in the real mailbox will cause an alert to be issued. The receiver may also be configured to guard against further activities by that attacker. For example, once the receiver identifies an email as part of a spear-phishing campaign, the administrator can then place information associated with the email (e.g., originating email IP address, return-to-address, etc.) in various security controls in the corporate network to prevent other employees from being targeted.

It should be understood that a synthetic user identifier stands in contrast to a simple alias. For example, a consumer may set up an alias in order to facilitate online transactions. Such an alias may take the form of an email address such as support@example.com. Unlike a synthetic user identifier, this alias is tied to a real entity (e.g., support personnel within a corporation). Further, communications that include such an alias are not blocked, but rather directed to a server within a secure network.

Figure 1:
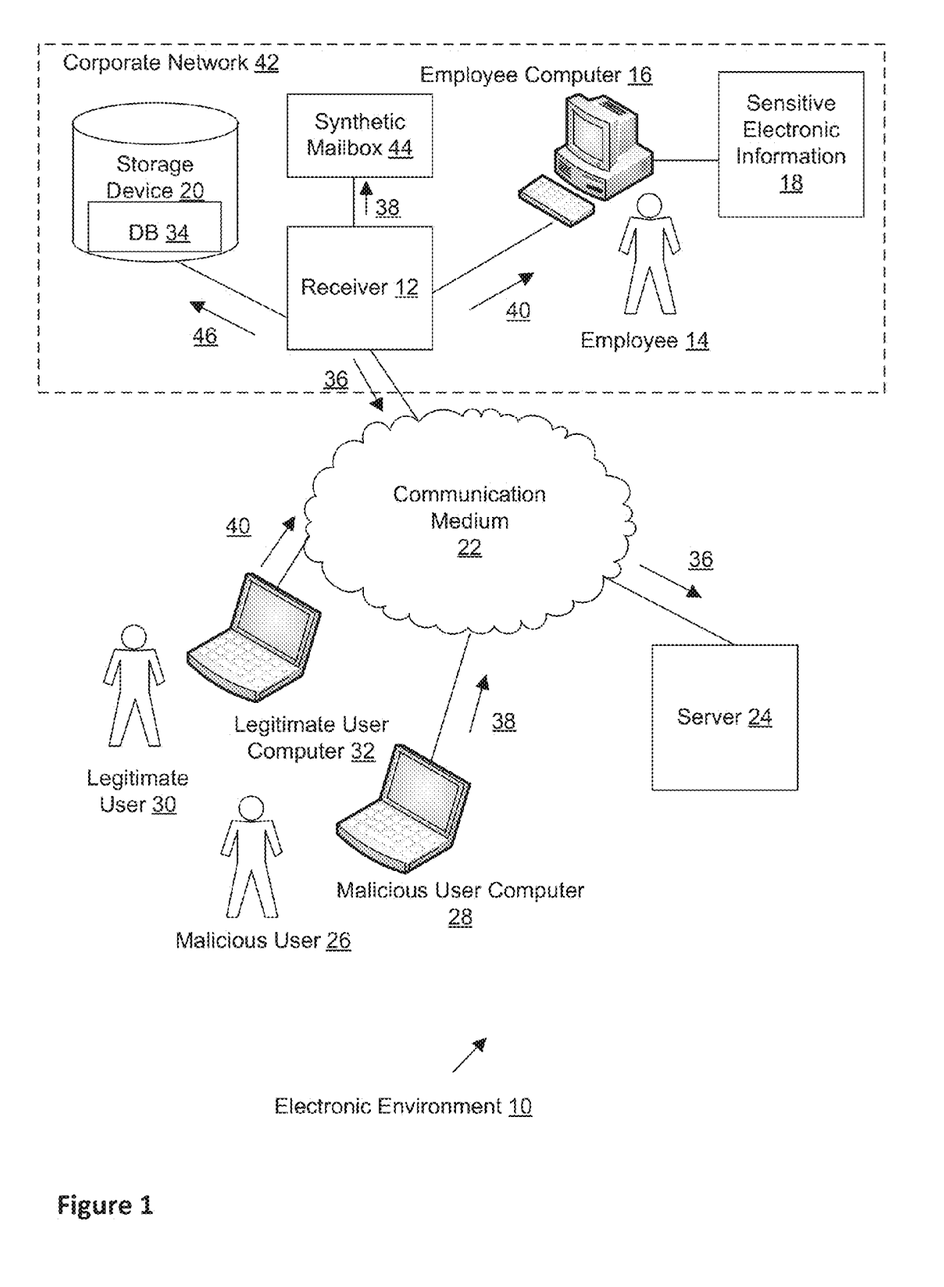
FIG. 1 is a block diagram illustrating an electronic environment for carrying out the improved technique.

FIG. 1 illustrates an example electronic environment 10 for carrying out the improved technique. Electronic environment 10 includes corporate network 42 which includes receiver 12, employee computer 16, storage device 20, and synthetic mailbox 44. Electronic environment 10 further includes communication medium 22, server 24, malicious user computer 28, and legitimate user computer 32.

Communication medium 22 provides network connections between receiver 12, server 24, malicious user computer 28, and legitimate user computer 32. Communications medium 22 may include various components, be set up in a variety of topologies, and implement a variety of protocols such as TCP/IP, UDP, ATM, Ethernet, Fibre Channel, combinations thereof, and the like. Furthermore, communications media 22 may include various components (e.g., cables, switches/routers, gateways/bridges, NAS/SAN appliances/nodes, interfaces, etc.). Moreover, the communications medium 22 is capable of having a variety of topologies (e.g., queue manager-and-spoke, ring, backbone, multi drop, point to-point, irregular, combinations thereof, and so on).

Receiver 12 is configured to send a profile creation request 36 to server 24 via communication medium 22. Receiver 12 is also configured to issue an alert in response to a receipt of communications from communication medium 22 that includes a particular user identifier that indentifies the false employee. Receiver 12 is further configured to store information intercepted from emails that include the particular user identifier that identifies the false employee on database 34. Receiver 12 takes the form of a server; in some arrangements, receiver 12 is a personal computer, laptop computer, or tablet computer. Further details of receiver 12 will be described below with respect to FIG. 2.

Profile creation request 36 includes the particular user identifier that indentifies the false employee of the corporation and is configured to cause server 24 to store the particular user identifier on server 24. Profile creation request 36 takes the form of a web page submission; in some arrangements, profile creation request 36 takes the form of an email, FTP submission, or SMS message.

Employee computer 16 belongs to employee 14 and has access to sensitive electronic information 18. Employee computer 16 takes the form of a desktop computer; in some arrangements, employee computer 16 is a laptop computer, a tablet computer, a personal digital assistant, or a smartphone.

Storage device 20 is configured to store information from emails that include the particular user identifier that identifies the false employee in database 34.

Server 24 is configured to host a social network website on which values of employee attributes are mapped to employee profiles. Server 24 is further configured to accept profile creation request 36 and set up an employee profile based on values of user identifiers of an employee specified in profile creation request 36.

Malicious user computer 28 belongs to malicious user 26 and is configured to display employee profiles from the social network website hosted on server 24 in a web browser window. Malicious user computer 28 is a laptop computer; in some arrangements, malicious user computer 28 is a desktop computer, a tablet computer, a personal digital assistant, or a smartphone.

Legitimate user computer 32 belongs to legitimate user 30 and is configured to display employee profiles from the social network website hosted on server 24 in a web browser window. Legitimate user computer 32 is a laptop computer; in some arrangements, legitimate user computer 32 is a desktop computer, a tablet computer, a personal digital assistant, or a smartphone.

During operation, receiver 12 sends profile creation request 36 to server 24 via communication medium 22 to create a false employee profile. In some arrangements, receiver 12 generates profile creation request 36 based on a random selection of plausible employee names stored in database 34. Receiver 12 sends profile creation request 36 to server 24 by accessing a social network website hosted by receiver 24 through a web browser. Profile creation request 36 then takes the form of data packets collected by the website (e.g., via a Javascript program run through the web browser) to form the false employee profile.

For example, suppose that, in an effort to protect sensitive electronic information 18, a network administrator of the Example Corporation generates profile creation request 36 to create a false employee profile for the Professional Social Network. Profile creation request 36 contains a name (e.g., "captain.ahab"), a position ("account manager"), and other information from which server 24 will create a plausible employee profile to be accessed on the Professional Social Network.

Upon receiving profile creation request 36 over communication medium 22, server 24 constructs an employee profile from the user identifier identifying the employee included in profile creation request 36. Further details regarding the employee profile created from profile creation request 36 will be described below with respect to FIG. 3.

At some point in time after server 24 creates the employee profile based on the user identifier included in profile creation request 36, malicious user 26 accesses the social network website from a web browser running on malicious user computer 28. In a spear-phishing attack, malicious user 26 has a specific objective (e.g., obtain sensitive salary information from the Example Corporation), and malicious user 26 uses the social network website to determine the employees that most likely have access to sensitive electronic information 18. Malicious user 26 then uses the social network to learn about personal information associated with an employee profile of such an employee so as to lure that employee to facilitate access to sensitive electronic information 18.

From the information that malicious user 26 gathers from the social network website, malicious user 26 sends a malicious email 38 to receiver 12 via communication medium 22. It should be understood that malicious user 26 does not know that malicious email 38 will be received at receiver 12. Rather, malicious user 26 intends for malicious email 38 to be sent, to the false employee. Receiver 12, however, will issue an alert in response to receiving email 38.

It should be understood that, in issuing an alert in response to receiving an email 38 that includes the particular user identifier that indentifies the false employee, receiver 12 places email 38 into a synthetic mailbox 44, which the administrator of corporate network 42 specifically sets up for the purpose of collecting such emails. The administrator may then add a rule to a filter stating that receiver 12 is to send each such email to a security team for inspection. Once a mail has been analyzed and identified as a being part of a spear-phishing attack, its characteristics can then be placed in various security controls on corporate network 42 to prevent other employees on corporate network 42 (such as employee 14) from being targeted.

Figure 2:
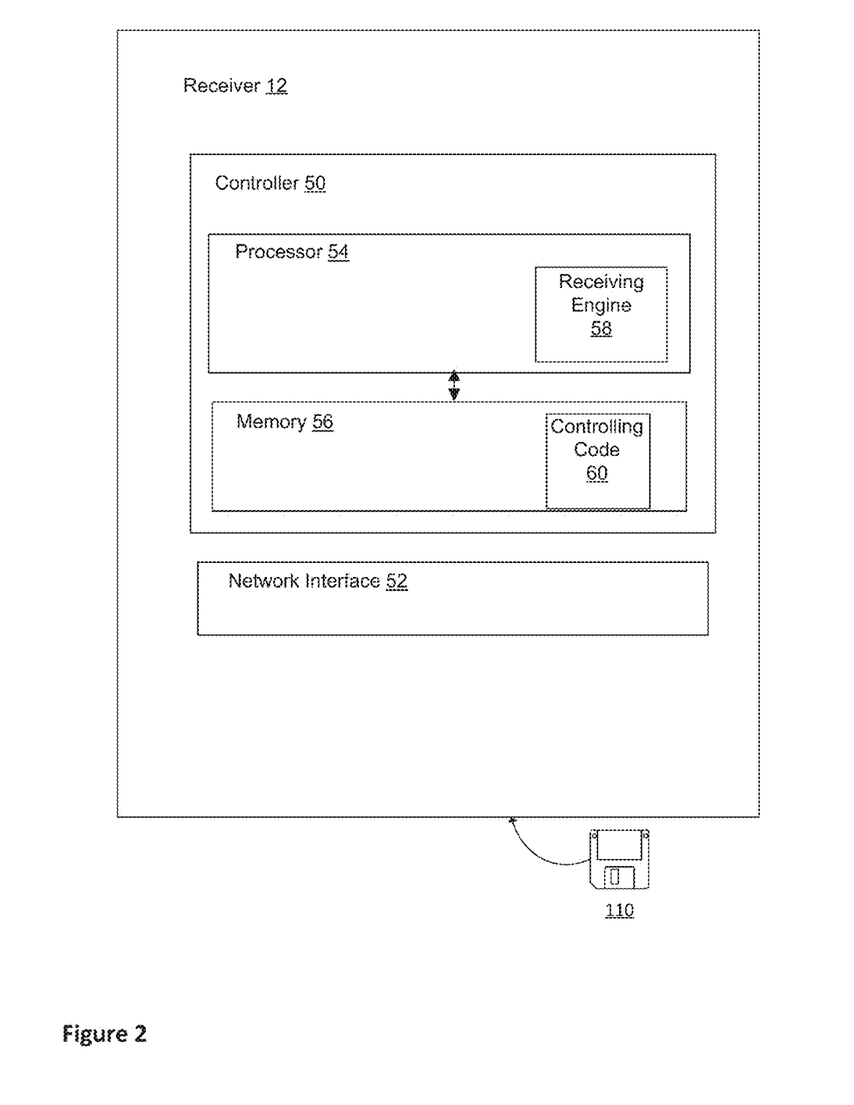
FIG. 2 is a block diagram illustrating an example receiver within the electronic environment shown in FIG. 1.

Details of receiver 12 are discussed below with respect to FIG. 2. FIG. 2 illustrates receiver 12. Receiver 12 includes controller 50, which includes processor 54 and memory 56, and network interface 52.

Memory 56 is configured to store controlling code 60 which includes instructions to protect sensitive electronic information 18 (see FIG. 1) from malicious communications over a network. Memory 56 generally takes the form of, e.g., random access memory, flash memory or a non-volatile memory.

Processor 54 takes the form of, but is not limited to, Intel or AMD-based MPUs, and can include a single or multi-cores each running single or multiple threads. Processor 54 is coupled to memory 56 and is configured to execute the controlling code 60 stored in memory 56. Processor 54 includes receiving engine 58.

Receiving engine 58 is configured, by processor 54, to intercept a communication that includes false information, e.g., a user identifier identifying a false employee.

Network interface 52 is constructed and arranged to send and receive data over communication medium 22. Specifically, network interface 52 is configured to send profile creation request 36 to server 24 over communication medium 22 and to receive malicious email 38 and legitimate email 40.

During operation, processor 54 configures receiving engine 58 to issue an alert in response to communications that include a user identifier identifying a false employee. Processor 54 stores such a user identifier in memory 56 and provides instructions for receiving engine 58 to map these values to a command to issue an alert in response to communications having a matching user identifier. Processor 54 further stores user identifiers identifying legitimate employees and provides instructions for receiving engine 58 to map these user identifiers to a command to not issue an alert in response to communications having matching user identifiers.

When network interface 52 receives legitimate email 40, it matches the contents of legitimate email 40 to a user identifier identifying legitimate employee. This match triggers a command to send legitimate email 40 to the employee identified by that user identifier.

When, on the other hand, network interface 52 receives malicious email 38, it matches content in malicious email 38 to a user identifier identifying a false employee that is stored in memory 56. Processor 54 then sends malicious email 38 to synthetic mailbox 44. Upon malicious email 38 being received in synthetic mailbox 44, processor 54 issues an alert such as sending a notification to a response team about malicious email 38. Details concerning the acquisition of malicious email 38 are discussed below with respect to FIG. 3 and FIG. 4.

Figure 3:
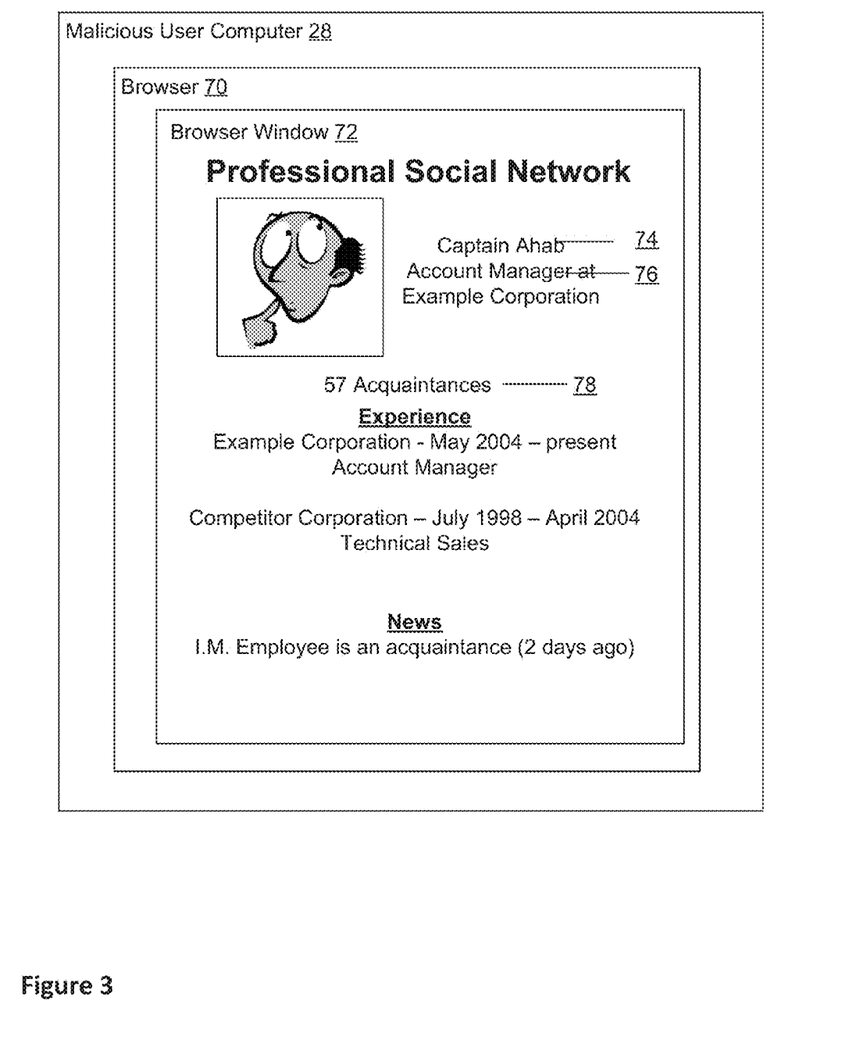
FIG. 3 is a schematic diagram illustrating an example social network content stored on a server and displayed on a malicious user computer within the electronic environment in FIG. 1.

FIG. 3 illustrates a social network website as seen within a browser window 72 of a browser 70 running on malicious user computer 28. In the social network website, there is information about a false employee identified by a user identifier in profile creation request 36. In this case, the attributes are employee name 74, with value "Captain Ahab," employee position 76, with value "Account Manager at Example Corporation," and acquaintances 78, or connections to other people (e.g., employees of other corporations). There may also be other information in this user identifier, such as background and experience. In some arrangements, the social network website also logs "news" events, such as the forming of a new acquaintance.

It should be understood that an administrator at receiving engine 12 designs a false employee so that the profile of the false employee appears to malicious user 26 as an actual employee of Example Corporation. Along these lines, the false employee should have a background that is consistent with Example Corporation's line of business. Further, the false employee should have connections to other profiles, some of which represent actual people.

Figure 4:
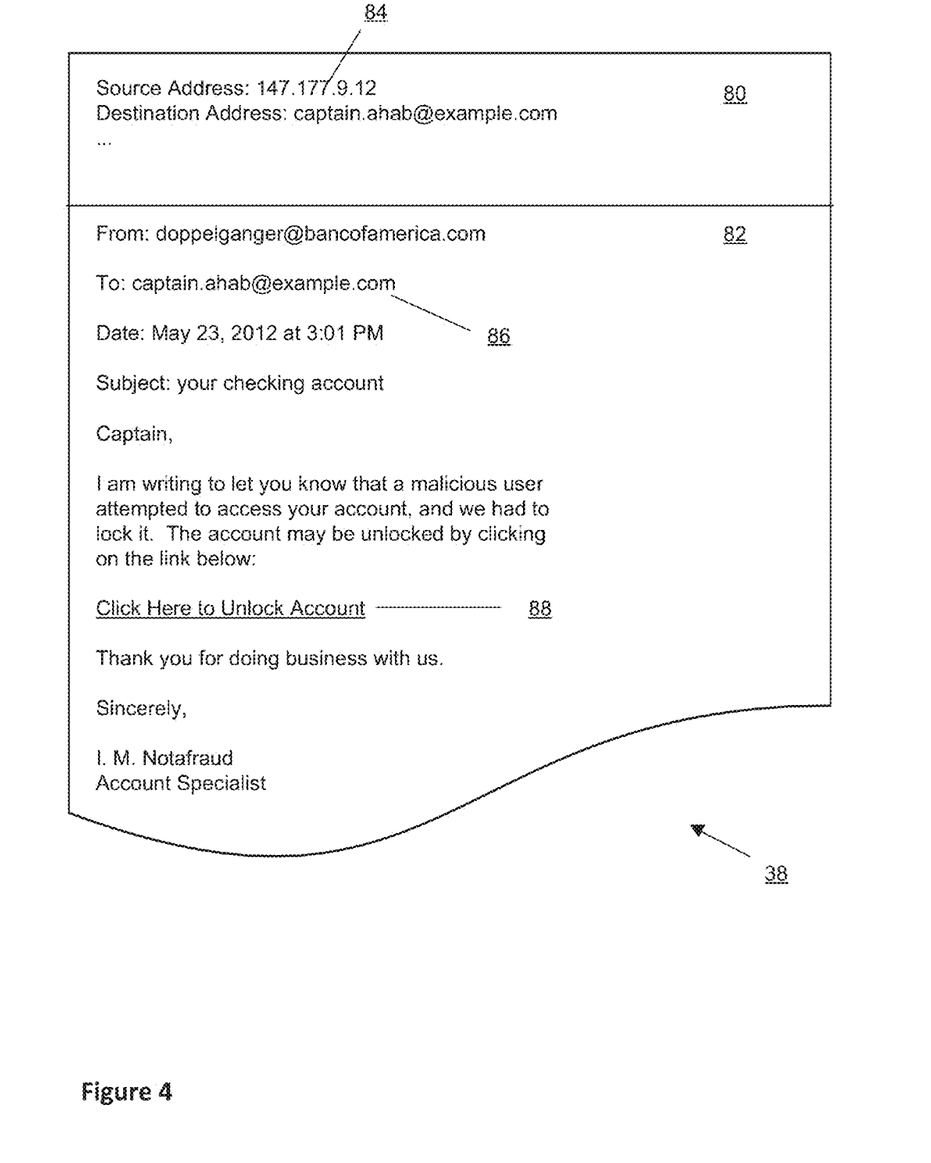
FIG. 4 is a schematic diagram illustrating an example email sent to the receiver shown in FIG. 2.

FIG. 4 illustrates content of malicious email 38 that malicious user 26 sends after examining browser window 72 (see FIG. 3). Malicious email 38 includes a header 80 and a payload 82.

Payload 82 includes a body 86 of an email message to the false employee having name 74 "Captain Ahab" (see FIG. 3), as well as a source address, destination address, date and subject headers. In the body 86 of malicious email 38, there is a link 88 to a website that, if activated, would install malware on an employee's computer. The source address in body 86 is typically a spoof of an actual well-known institution ("bancofamerica").

Header 80 includes source and destination information 84. In some arrangements, the source information 84 leads to an actual address from which malicious user 26 sent malicious email 38.

During operation, receiving engine 58 scans header 80 and payload 82 for a user identifier identifying a false employee. For example, header 80 of email 38 includes, as the destination address, the email address of false employee "captain.ahab." Although the email address was not listed in the profile of the false employee, it is known that malicious user 26 will know that employee emails in certain corporations follow particular patterns (e.g., firstname.lastname@corporationname.com).

Receiving engine 58 matches the first name and last name of the email address ("plotz", "bull") to a first name and last name stored in memory 56. Because Captain Ahab is the name of a false employee, processor 54 stored the names "Captain" and "Ahab" in memory as part of the configuration of receiving engine 58.

Upon receiving engine 58 finding the match to the user identifier identifying the false employee, processor 54 stores email 38 in mailbox 44 and issues an alert to a security team to inspect emails in mailbox 44. Receiver 12 may take further action in response to results of work on behalf of the security team. For example, receiver 12 may receive an email address from the security team from which all communications should be blocked. Receiver 12 may store such an email address in database 34. Further, once the source of malicious email 38 has been learned, the administrator may take steps to record activity for forensic evidence needed to prosecute malicious user 26 of criminal activity. In any case, receiver 12 blocks malicious email 38 from being received by employee computer 16 (see FIG. 1) without any previous such malicious emails being received by any other computers within corporate network 42.

Figure 5:
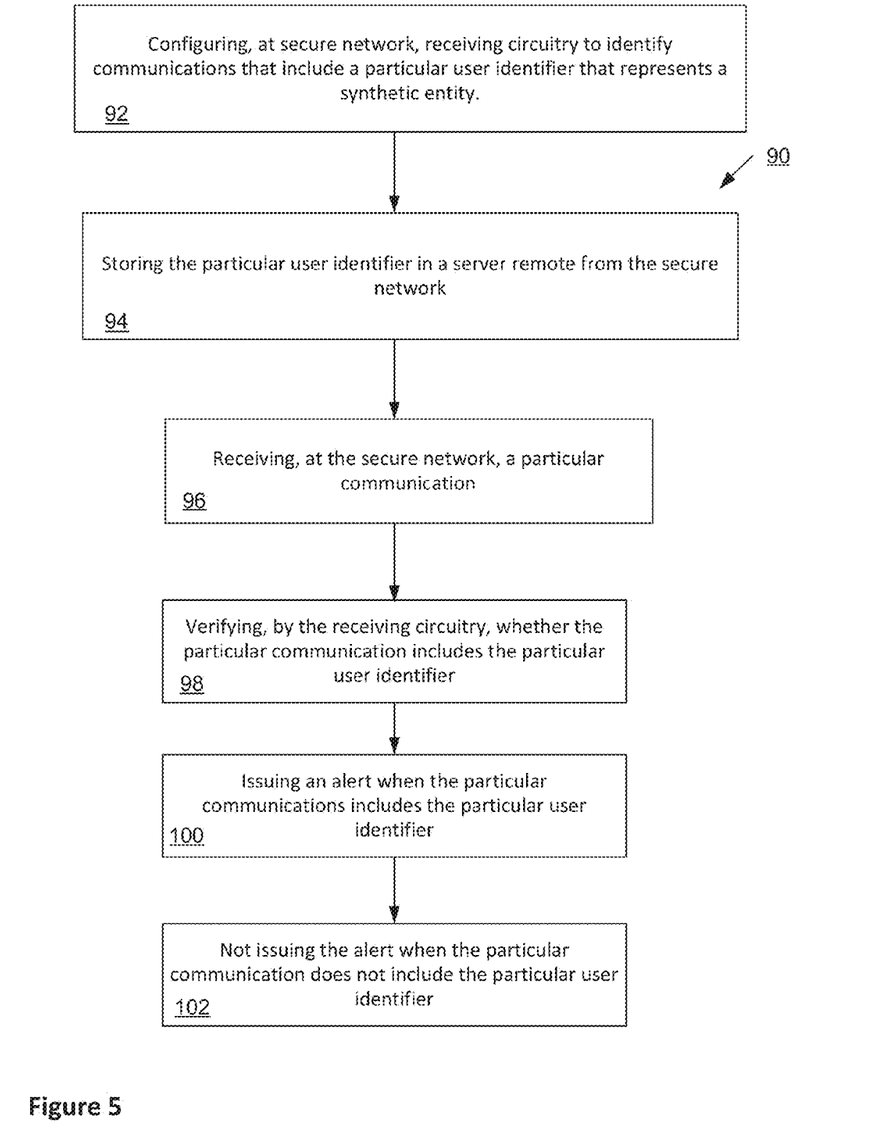
FIG. 5 is a flow chart illustrating a method of carrying out the improved technique within the electronic environment shown in FIG. 1.

FIG. 5 illustrates a method 90 of protecting sensitive electronic information from malicious communications over a network. In step 92, receiving circuitry is configured at a first location on the network to intercept communications that include a particular user identifier. In step 94, the particular user identifier is stored in a server at a second location on the network, the second location being remote from the first location. In step 96, a communication is blocked by the receiving circuitry at the first location from reaching a destination address when then communication includes the particular user identifier. In step 98, the communication is allowed by the receiving circuitry at the first location to reach a destination address when then communication does not include the particular user identifier.

While various embodiments of the invention have been particularly shown and described, it will be understood by those skilled in the art that various changes in form and details may be made therein without departing from the spirit and scope of the invention as defined by the appended claims.

For example, it should be understood that the above example illustrated a corporate network. Other types of networks may also be considered, e.g., government networks, private networks, etc.

Further, the example above described planting false information in a social network website. Other locations in which false information can be located includes, but is not limited to, a corporate website having an employee directory, employee home pages, blogs, and the like.

Furthermore, it should be understood that some embodiments are directed to receiver 12 which is constructed and arranged to protect sensitive electronic information from malicious communications over a network. Some embodiments are directed to receiver 12. Some embodiments are directed to a system which protects sensitive electronic information from malicious communications over a network. Some embodiments are directed to a process of protecting sensitive electronic information from malicious communications over a network. Also, some embodiments are directed to a computer program product which enables computer logic to protect sensitive electronic information from malicious communications over a network.

In some arrangements, receiver 12 is implemented by a set of processors or other types of control/processing circuitry running software. In such arrangements, the software instructions can be delivered to receiver 12 in the form of a computer program product 110 (FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of protecting a secure network from malicious communications, the method comprising:
    configuring, on the secure network, receiving circuitry to identify communications that include a particular user identifier;
    storing the particular user identifier in a server remote from the secure network;
    receiving, at the secure network, a particular communication;
    verifying, by the receiving circuitry, whether the particular communication includes the particular user identifier;
    issuing an alert when the particular communication includes the particular user identifier;
    not issuing the alert when the particular communication does not include the particular user identifier, wherein the server hosts a website of a social network and maps values of the user identifier corresponding to each employee of the set of employees to an employee profile on the social network;
    wherein storing the particular user identifier includes: sending the particular user identifier to the server, the server generating an employee profile of a false employee on the social network from the particular user identifier
    wherein the particular communication that includes the particular user identifier is sent by a malicious user and further includes identification information identifying the malicious user; and
    wherein the method further comprises: extracting the identification information identifying the malicious user; and issuing the alert upon receiving communications that include the identification information identifying the malicious user.

2. A method as in claim 1, wherein the identification data information includes an address of the malicious user; and
wherein the method further comprises:
sending additional communications to the address of the malicious user, the additional communications being configured to induce the malicious user to provide additional identification data information.

3. A method as in claim 1, wherein the secure network belongs to a corporation having a set of employees, each employee of the set of employees having a user identifier corresponding to the employee;
Wherein in the method father comprises: method further comprises:
mapping the particular user identifier to a command of the receiving circuitry that is configured to issue the alert, and
not mapping the user identifier corresponding to the employee of the set of employees to a command of the receiving circuitry that is configured to issue the alert.

4. A method as in claim 1,
wherein a user identifier of an employee includes an employee name;
wherein an employee profile includes a connection attribute which represents a connection to another employee profile on the social network and has a value as the name of the user identifier from which the other employee profile was generated;
wherein sending the particular user identifier to the server includes:
assigning the name of an employee profile generated form a user identifier of an employee of the set of employees to the value of the connection attribute of the employee profile of the false employee.

5. A method as in claim 1, wherein the communication that includes the particular user identifier includes an email having a header;
wherein extracting the identification data identifying the malicious user includes:
obtaining a source address from the header of the email, the source address belonging to a particular location on the network from which the email was sent; and
wherein issuing the alert when the particular communications includes the particular user identifier includes: saving the source address in a database.

6. A system constructed and arranged to protect a secure network from malicious communications, the system comprising:
a network interface;
memory; and
a controller including receiving circuitry and controlling circuitry coupled to the memory, the controlling circuitry being constructed and arranged to:
configure, on the secure network, receiving circuitry to identify communications that include a particular user identifier;
store the particular user identifier in a server remote from the secure network;
receive, at the secure network, a particular communication;
cause the receiving circuitry to verify whether the particular communication includes the particular user identifier;
issue an alert when the particular communication includes the particular user identifier;
not issue the alert when the particular communication does not include the particular user identifier wherein the server hosts a website of a social network and maps values of the user identifier corresponding to the employee of the set of employees to an employee profile on the social network; and
wherein storing the particular user identifier includes:
sending the particular user identifier to the server, the server generating an employee profile of a false employee on the social network from the particular user identifier
wherein the particular communication that includes the particular user identifier is sent by a malicious user and further includes identification information identifying the malicious user; and
wherein the method further comprises: extracting the identification information identifying the malicious user; and issuing the alert upon receiving communications that include the identification information identifying the malicious user.

7. A system as in claim 6,
wherein the particular communication that includes the particular user identifier is sent by a malicious user and further includes identification information identifying the malicious user;
wherein the controlling circuitry is further constructed and arranged to:
extract the identification information identifying the malicious user, and
issue the alert upon receiving communications that include the identification information identifying the malicious user.

8. A system as in claim 7,
wherein the identification information includes an address of the malicious user; and
wherein the controlling circuitry is further constructed and arranged to:
send additional communications to the address of the malicious user, the additional communications being configured to induce the malicious user to provide additional identification information.

9. A method as in claim 7,
wherein the secure network belongs to a corporation having a set of employees, each employee of the set of employees having a user identifier corresponding to the employee;
wherein the controlling circuitry is further constructed and arranged to:
map the particular user identifier to a command of the receiving circuitry that is configured to issue the alert, and
map the user identifier corresponding to the employee of the set of employees to a command of the receiving circuitry that is configured to not issue the alert.

10. A system as in claim 6,
wherein a user identifier of an employee includes an employee name;
wherein an employee profile includes a connection attribute which represents a connection to another employee profile on the social network and has a value as the name of the user identifier from which the other employee profile was generated;
wherein sending the particular user identifier to the server includes:
assigning the name of an employee profile generated form a user identifier of an employee of the set of employees to the value of the connection attribute of the employee profile of the false employee.

11. A system as in claim 7,
wherein the communication that includes the false information includes an email having a header;
wherein extracting the identification data identifying the malicious user includes:
obtaining a source address from the header of the email, the source address belonging to a particular location on the network from which the email was sent; and
wherein issuing the alert when the particular communications includes the particular user identifier includes:
saving the source address in a database.

12. A computer program product having a non-transitory, computer-readable storage medium which stores code to protect a secure network from malicious communications, the code including instructions to:
configure, on the secure network, receiving circuitry to identify communications that include a particular user identifier;
store the particular user identifier in a server remote from the secure network;
receive, at the secure network, a particular communication;
verify, by the receiving circuitry, whether the particular communication includes the particular user identifier;
issue an alert when the particular communication includes the particular user identifier;
not issue the alert when the particular communication does not include the particular user identifier wherein the server hosts a website of a social network and maps values of the user identifier corresponding to the employee of the set of employees to an employee profile on the social network; and
wherein storing the particular user identifier includes:
sending the particular user identifier to the server, the server generating an employee profile of a false employee on the social network from the particular user identifier
wherein the particular communication that includes the particular user identifier is sent by a malicious user and further includes identification information identifying the malicious user; and
wherein the method further comprises: extracting the identification information identifying the malicious user; and issuing the alert upon receiving communications that include the identification information identifying the malicious user.

13. A computer program product as in claim 12,
wherein the particular communication that includes the particular user identifier is sent by a malicious user and further includes identification information identifying the malicious user;
wherein the controlling circuitry is further constructed and arranged to:
extract the identification information identifying the malicious user, and
issue the alert upon receiving communications that include the identification information identifying the malicious user.

14. A computer program product as in claim 13,
wherein the identification information includes an address of the malicious user; and
wherein the code includes further instructions to:
send additional communications to the address of the malicious user, the additional communications being configured to induce the malicious user to provide additional identification information.

15. A method as in claim 13,
wherein the secure network belongs to a corporation having a set of employees, each employee of the set of employees having a user identifier corresponding to the employee;
wherein the code includes further instructions to:
map the particular user identifier to a command of the receiving circuitry that is configured to issue the alert, and
map the user identifier corresponding to the employee of the set of employees to a command of the receiving circuitry that is configured to not issue the alert.

16. A computer program product as in claim 12,
wherein a user identifier of an employee includes an employee name;
wherein an employee profile includes a connection attribute which represents a connection to another employee profile on the social network and has a value as the name of the user identifier from which the other employee profile was generated;
wherein sending the particular user identifier to the server includes:
assigning the name of an employee profile generated form a user identifier of an employee of the set of employees to the value of the connection attribute of the employee profile of the false employee.

17. A method as in claim 1, wherein the employee profile generated from the particular user identifier is distinct from the employee profile of each employee of the set of employees;
wherein the method further comprises creating the particular user identifier from a list of plausible employee names, each plausible employee name of the list of plausible employee names being distinct from the user identifier of each employee of the set of employees.

18. A method as in claim 17, wherein creating the particular user identifier from the list of plausible employee names includes performing a random selection from the list of plausible employee names.

19. A method as in claim 17, wherein sending the particular user identifier to the server includes providing instructions to the server hosting the website of the social network to generate the employee profile of the false employee from the particular user identifier, the employee profile having attributes included in profiles of employees of the set of employees on the website of the social network.

* * * * *